United States Patent [19]

Skalmierski et al.

[11] 4,373,980

[45] Feb. 15, 1983

[54] METHOD OF MANUFACTURE OF SOUND BOX OF STRINGED INSTRUMENTS, PARTICULARLY VIOLINS

[75] Inventors: Bogdan Skalmierski, Gliwice; Krzysztof Mroz, Radków, both of Poland

[73] Assignee: Politechnika Slaska im. Wincentego Pstrowskiego, Gliwice, Poland

[21] Appl. No.: 230,271

[22] Filed: Jan. 30, 1981

[30] Foreign Application Priority Data

Feb. 8, 1980 [PL] Poland .................................. 221943
May 16, 1980 [PL] Poland .................................. 224327

[51] Int. Cl.[3] .......................... G10D 1/02; B32B 31/00

[52] U.S. Cl. ...................................... 156/160; 84/275; 269/266; 269/287

[58] Field of Search .......................... 84/274, 275, 276; 244/309 B, 309 AA, 258, 256, 278 R; 269/909, 104, 266, 287, 45; 156/160, 165, 494; 273/73 A

[56] References Cited

U.S. PATENT DOCUMENTS 1,945,043 1/1934 Jaffe .................................. 273/73 A
1,992,717 2/1935 Proctor .............................. 273/73 A
2,800,867 7/1957 Smith .................................. 269/287

OTHER PUBLICATIONS

Hutchins, The Physics of Violins, Scientific America, Nov. 1962.

*Primary Examiner*—Michael W. Ball

[57] ABSTRACT

Method of manufacture of sound box stringed instruments, particularly violins, wherein a state of stress is produced in the arc-shaped sound box by providing a curvature opposite to that produced by the stretched strings, the side rim is elastically bent, suitable battens are cemented on to preliminarily bent sides, the side rim is bent to the final shape and cemented to the arc-shaped top plate with the arc-shaped bass beam cemented into it in a traditional way and the said sound box is closed by an arc-shaped bottom plate.

The device for shaping the side rim consists of an oval ring (1) with at least four holes (2) situated in the axis of the said ring (1). The device is preferably provided with at least four threaded sleeves (3) to receive set screws (4), (5) and adjusting screws (6) at the point of the holes (2).

1 Claim, 1 Drawing Figure

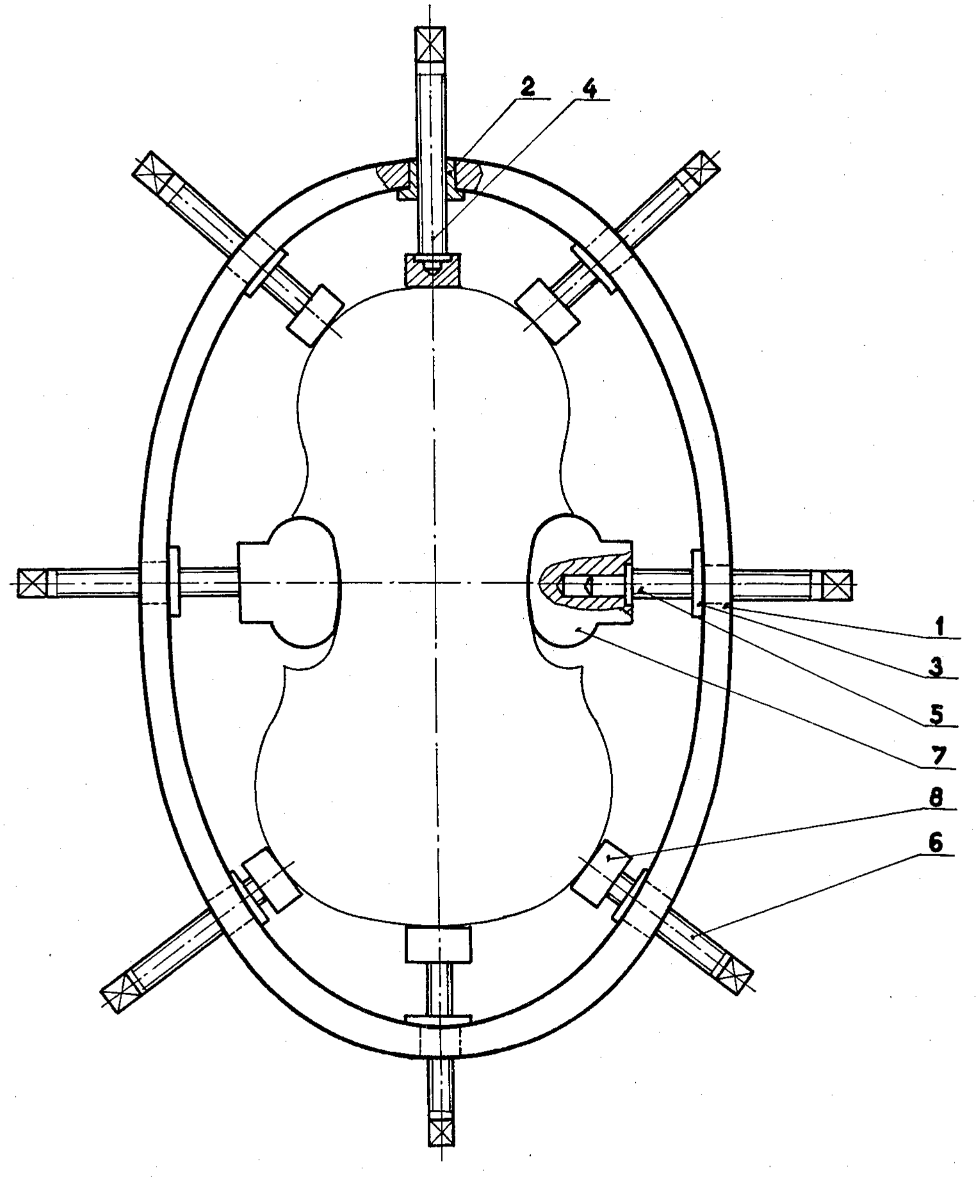
2
4
1
3
5
7
8
6

METHOD OF MANUFACTURE OF SOUND BOX OF STRINGED INSTRUMENTS, PARTICULARLY VIOLINS

This invention relates to the method of manufacture of sound boxes of stringed instruments, particularly violins, and to a device for shaping the side rim of stringed instruments, particularly violins.

The known and commonly used method of manufacture of violins and other stringed instruments consists in matching all the component parts during their assembly except for cementing the bass beam to the upper plate where stresses are induced due to bending. The bass beam is bent prior to being cemented in such a way that it is matched to the surface of the upper plate. A proper shape of the side rim is obtained by shaping the said side rim when hot. When shaping this rim either an external or an internal mould is generally used. The curvature of the sides as well as battens guarantees a stress-free state of the rim before it has been matched to the accurately matched upper and lower parts.

A serious drawback of the known method described above consists in that the compressive forces due to the tension of strings are carried by the upper table made by a traditional method (W. Kaminski. J. Swirek "Violin Making" Lutnictwo, PWN, Krakow, 1972).

According to the results of the investigations carried out by Backhaus, the perfection of the instrument depends upon the distribution of formants within its spectrum. The instrument is the more perfect, the more the zones of strongest formants are close to 4,000 c/s (S. Golechowski, N. Drobner—Musical accoustics, PWN, 1953). The violins made in a traditional way do not have this property the strongest formants of such instruments being within a zone below 3,000 c/s.

The aim of this invention is the displacement of the zone of strong formants to the frequency range from 3,000 up to 4,000 c/s. This aim has been achieved by devising a new manufacturing process consisting in the introduction of a preliminary state of stress in to the sound box aimed at producing tension of the upper plate which should act as a membrane, and by constructing a special device for appropriately shaping the side rim.

In the method according to the invention a state of stress is introduced in the sound box by making an arc-shaped upper and lower plate bent in a direction opposite to the natural bending tendency caused by the tension of the strings, and by elastically shaping the side faces. After a preliminary elastic bending of the side faces suitable batten are cemented thereto, the side rim is elastically bent to final shape and cemented to the arc-shaped upper table with the built-in bass beam cemented in a known way and the sound box is closed with the bottom arc-shaped table.

The device for forming the side rim according to this invention consists of an oval ring with at least four holes situated in the ring axis. The said ring is preferably provided with at least four threaded sleeves to receive thrust bolts and adjusting screws on the spot of the holes.

A considerable advantage of the method according to this invention is the manufacture of the sound box within a preliminary state of stress which displace the zones of strong amplification (formants) toward greater frequencies. In this way the sound box acts as a high-pass filter thus improving the acoustic properties. The reason of this phenomenon is that the more harmonic component amplifications of higher frequency enable greater power to be emitted thus ensuring better carrying capacity of the instruments. The device according to the invention enables such a shape of the side rim to be obtained while simultaneously maintaining its elastic properties which would enable the obtaining of tensile forces in the sound box acting thereon.

The object of the invention is accomplished by the following example and by the embodiment shown in the FIGURE of the accompanying drawing, which presents a view of the device for forming the side rim of stringed instruments.

The device consists of an oval ring 1 with eight threaded holes 2 together with threaded sleeves 3 to receive thrust screws 4 and 5 and adjusting screws 6.

The method of manufacture of the sound box is as follows:

The upper plate of the violin is given a curvature opposite to the tendency of bending of the sound box by the strings. After the initially partial bending of sides the battens are cemented to them and, in the next stage, the side rim is elastically bent to the final shape. The said side rim is next combined by means of an adhesive with the arc-shaped upper plate with the traditionally cemented-in bass beam. After joining both parts together the upper plate is subjected to tension produced by the side rim and battens.

The sound box is closed by an arc-shaped upper plate bent in the opposite direction as compared with the bending tendency produced by the stretched strings. After having cemented together all parts the strut is removed from the box.

The described device is used in the way as follows:

The side rim without battens combined with the backs is put into the ring 1 and the contour of the middle part is properly shaped by screwing home the adjusting screws 5. After having combined the strips to the rim screw home the set screws 4 and the adjusting screws 6 are adjusted in order to obtain the final shape. The adjusting screws 6 serve for the correction of the possible deviations of the shape of the side rim from symmetry.

Members 7 and 8 serve for protecting the side surface against mechanical damage.

We claim:

1. A method of manufacturing a sound box of a stringed musical instrument, particularly a violin, comprising subjecting the top and bottom plates of the sound box to stress causing an arc-shaped configuration having a curvature opposite to the curvature normally produced by the stretched strings of the finished instrument, preliminarily bending side members to form a side rim and cementing battens thereto, elastically bending said side rim to the desired final configuration, bonding said top and bottom plates to said side rim, and releasing said stress, whereby said top plate is tensioned to produce improved acoustical properties in the sound box.

* * * * *